United States Patent [19]

Jenkins

[11] Patent Number: 5,426,573
[45] Date of Patent: Jun. 20, 1995

[54] CASKET LID RECESSED LIGHT UNIT

[76] Inventor: Sophenia Jenkins, 324 W. Normal Pkwy., Chicago, Ill. 60621

[21] Appl. No.: 36,070

[22] Filed: Mar. 23, 1993

[51] Int. Cl.$^6$ .............................................. F21V 33/00
[52] U.S. Cl. .................... 362/154; 362/145; 52/133; 40/564; 27/1; 27/DIG. 1; 403/231; 403/232.1; 403/331
[58] Field of Search ................ 362/145, 133, 154, 31, 362/364, 365, 366; 52/128, 133, 134, 139, 142, 656.1; 403/231, 232.1, 381, 331, 234, 237, 403, 402, 217, 219; 27/1, DIG. 1, 14; 312/406.2; 24/563, 531; 40/564, 565

[56] References Cited

U.S. PATENT DOCUMENTS

| | | | |
|---|---|---|---|
| 1,452,029 | 4/1923 | Deuel | 362/154 |
| 1,471,023 | 10/1923 | Bien | 362/154 |
| 1,505,625 | 8/1924 | Dearth | 40/365 |
| 1,871,611 | 7/1930 | Headland | 362/253 X |
| 1,986,465 | 1/1935 | Dempsey | 403/381 |
| 2,019,192 | 10/1935 | Minkel | 362/121 X |
| 2,179,409 | 11/1939 | Hulsart | 362/154 |
| 2,611,160 | 9/1952 | Hanesse | 403/237 |
| 2,624,083 | 1/1953 | Butler | 403/217 |
| 3,268,151 | 8/1966 | Soto | 24/16 PB |
| 4,035,632 | 7/1977 | Rayman | 40/545 |
| 4,232,465 | 11/1980 | Stoddard | 362/31 |
| 4,559,731 | 12/1985 | Frois et al. | 40/546 |
| 4,648,162 | 3/1987 | Daino | 27/1 |
| 4,781,008 | 11/1988 | Lyons, Jr. | 52/656.1 |
| 4,941,071 | 7/1990 | Knauf | 362/133 |
| 5,303,127 | 4/1994 | Kosann | 362/296 |

Primary Examiner—Ira S. Lazarus
Assistant Examiner—Thomas M. Sember

[57] ABSTRACT

A recessed light fixture for a burial casket that provides a source of illumination to light decorative art work installed in the lid; at the same time it provides softly diffused light for a more pleasing illumination of the interior of the casket. The unit fits inside the concave area of the lid of the standard burial casket and requires no design changes. It is constructed of light weight rigid insulation. The housing is described in two forms; a modular unit with alternate methods of joining the walls; novel corner fittings (24), (26), (28) (30) and brackets (20) (22) attached by clips (32); self retaining "single half-blind dovetail" joints (76) or adhesive surfaces (74). It is also described as a single molded unit (78) formed of insulating material. The fixture has a powered light source (36), a reflector (84) and integral reflective surfaces (82).

8 Claims, 4 Drawing Sheets

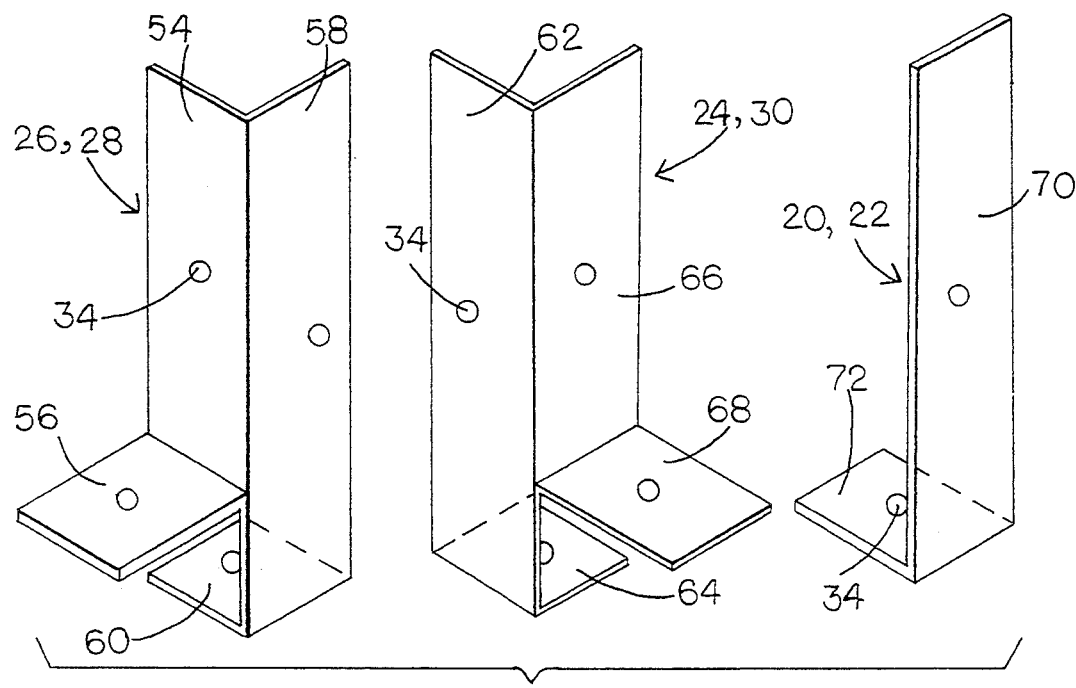
FIG. 4
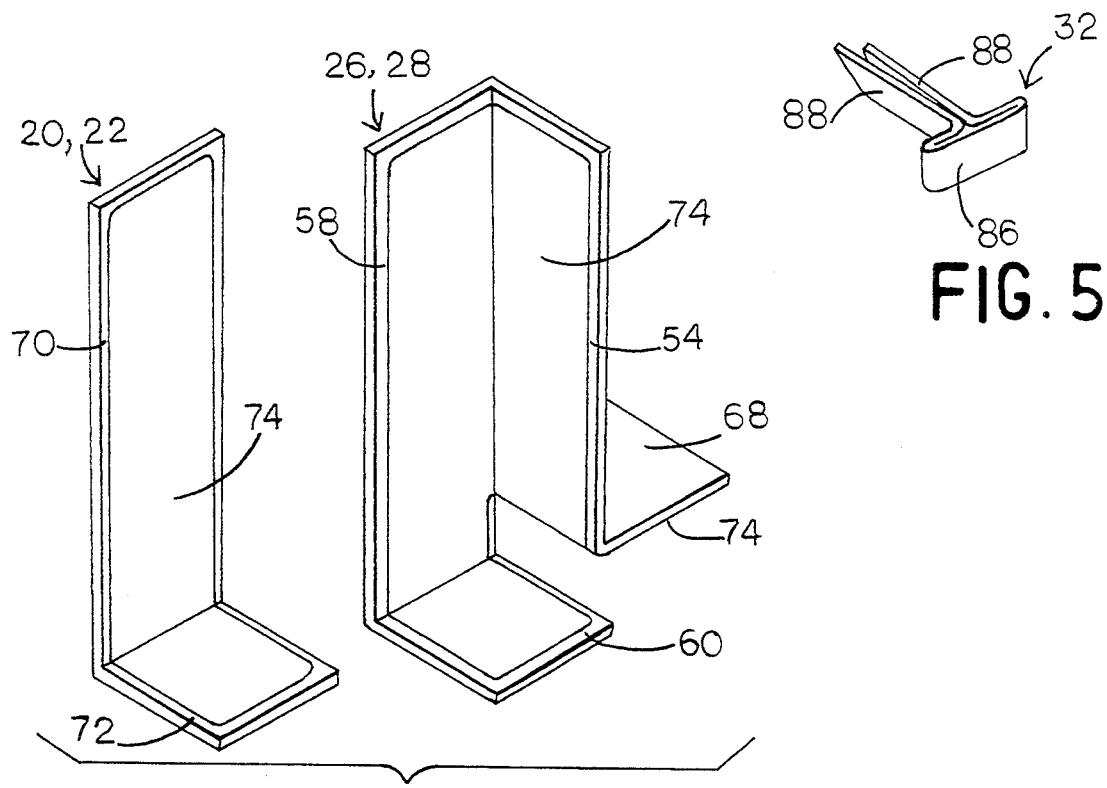
FIG. 5
FIG. 6

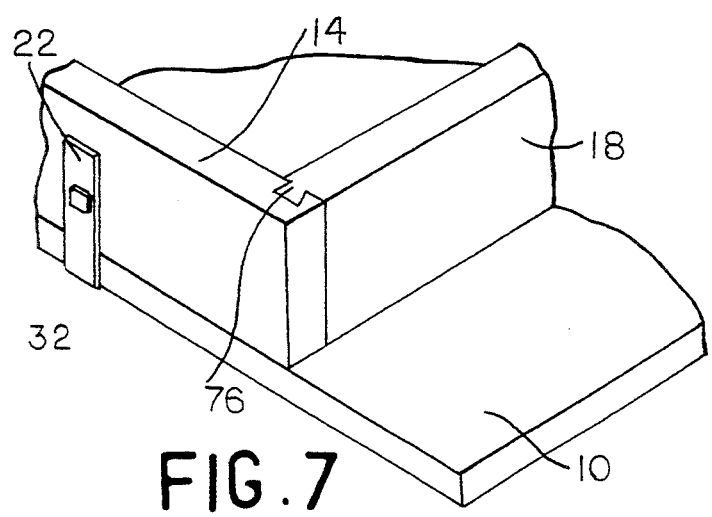
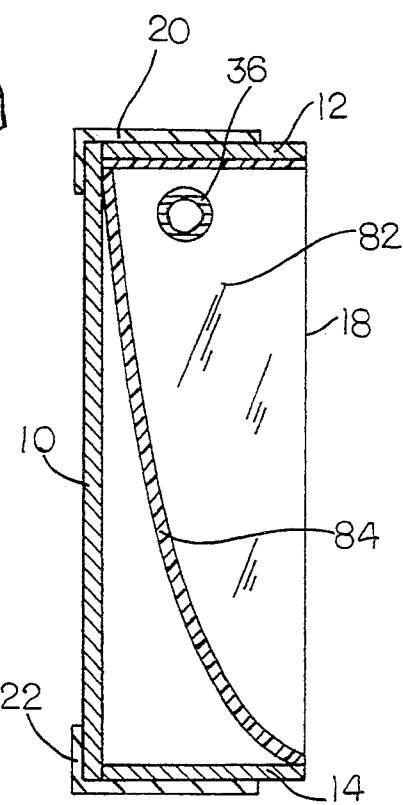
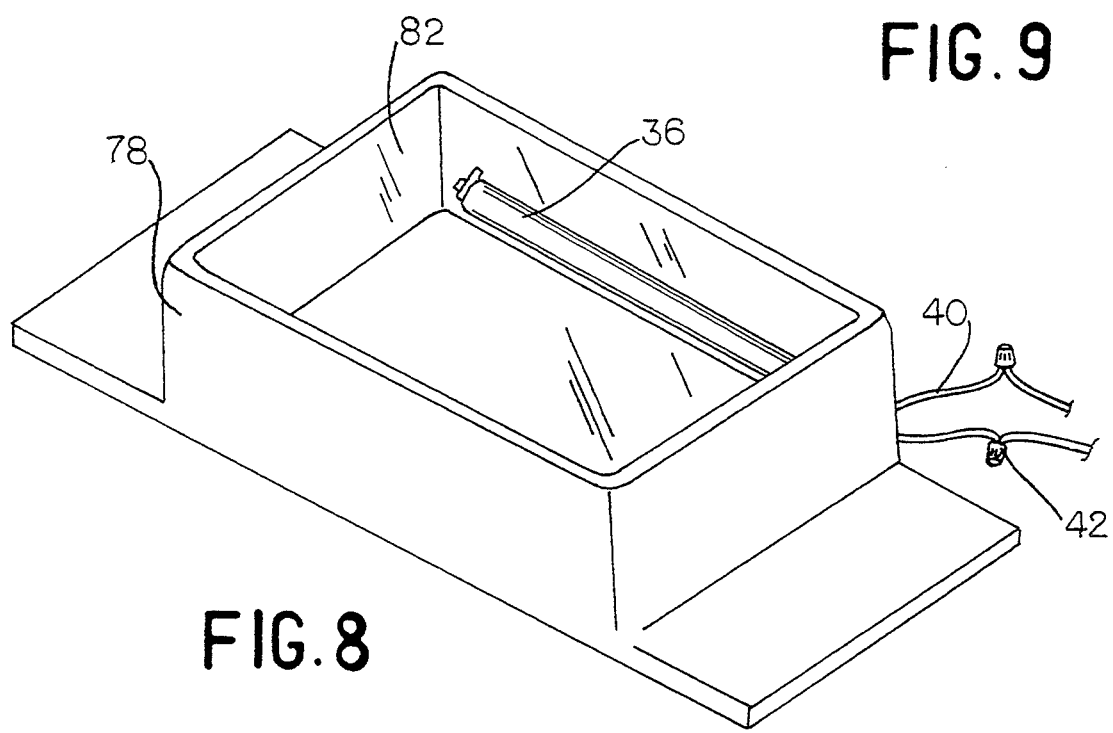

CASKET LID RECESSED LIGHT UNIT

BACKGROUND

FIELD OF INVENTION

This invention relates to burial caskets, specifically a novel recessed light source set into the lid of a casket and has as one of its objectives to illuminate any decorative art, such as a stained glass panel, that is installed in front of it as part of the casket's lid. The interior of caskets have been lit by various means. U.S. Pat. No. 2,179,409 to Hulsart, Nov. 7, 1939 is a source of light from a gas filled glass tube concealed around the edge of the lid of a burial casket. U.S. Pat. No. 1,912,035 to Grant, May 30, 1933 is a burial casket lamp housing that fits over the edge of the lid of a casket. U.S. Pat. No. 1,471,023 to Bien, Oct. 16, 1923 is a burial casket with a light source behind a collapsible canopy, and as shown in U.S. Pat. No. 1,452,029 to Deuel, Apr. 17, 1923 coffin construction should be made more personalized by the use of an insignia panel. Unlike the present patent none of the above provide a source of light recessed into a casket lid that softly illuminates the interior of the casket with light transmitted through a translucent work of art.

DESCRIPTION OF PRIOR ART

Throughout the ages art has been associated with the disposal of the remains of mortal life. The use of stained glass in associated with what is called "funeral art" or "memorial art" has held a prominent place, most notably in the adornment of mausoleums. The stained glass cremation urn in U.S. Pat. No. 4,648,162 to Daino, March 1987 is an example of the use of this art form to fabricate a container for the remains.

The use of the light box to provide illumination for the transmittal of light through transparent members is not a new principle, U.S. Pat. No. 4,232,465 to Stoddard, Nov. 11, 1980 is an illuminated display stand made of a transparent material with light-transmitting walls and a wood frame while U.S. Pat. No. 4,035,632 to Rayman, Jul 12, 1977 and U.S. Pat. No. 1,505,625 to Dearth, Aug. 19, 1924 are examples of its use in light unit systems for the purposes of security and house number display, but this application of the principle of the light box is unique. The development of light weight insulation materials that are often rigid in nature has made this new application possible. The recessed light unit makes it possible for stained glass and other art forms that depend on the transmission of light to be used as decorative elements of burial caskets by providing back-lighting for them.

OBJECTS AND ADVANTAGES

Accordingly, several objects and advantages of my casket lid recessed light unit are:

(a) to provide a source of light recessed into a casket lid that will softly illuminate the deceased and the interior of the casket with the light transmitted through the art work;

(b) to provide a source of light recessed into a casket lid from a unit that requires no changes in the design of most standard burial caskets to accommodate the lighting unit and the art;

(c) to provide a source of light recessed into a casket lid from a unit constructed of a material that is easily cut with a standard utility knife so that the outer edges of the unit can be shaped to fit the inside contour of any casket lid;

(d) to provide a source of light recessed into a casket lid that casket finishers can install without additional specialize tools, skills or knowledge;

(e) to provide a source of light recessed into a casket's lid that is versatile and can be used to back light any art that is enhanced by illumination; these include but are not excluded to the artistic techniques of, leaded, copperfoiled, carved, etched, painted, laminated, fused, overlayed or any simulation thereof, utilizing glass, plastic, plexiglass of any other materials which have a high index of light transmission;

(f) to provide a source of light recessed into a casket lid that does not require the permanent attachment of the art to the unit so that the art can be removed and retained, not being disposed of with the casket;

(g) to provide a source of light recessed into a casket lid from a unit that can use any type of lamp; incandescent, fluorescent, halogen or neon;

(h) to provide a source of light recessed into a casket lid from a unit with walls that are easily penetrated; allowing easy installation of many types of standard light sockets; and allowing the use of multiple low-watt light sources for even illumination with the placement being chosen to best enhance the art;

(i) to provide a source of light recessed into a casket lid from a unit that minimizes the transference of heat generated by the lamps due to the insulating properties of the material of which it is constructed;

(j) to provide a source of light recesses into a casket lid from a unit that is light weight therefore not adding greatly to the weight of the casket's lid or the overall weight of the casket;

(k) another object of the recessed light unit is to provide a casket illumination system which is inexpensive to manufacture; is low cast to ship and store because of its light weight and collapsible design, (l) another advantage of the recessed light unit is its choice of two embodiments, the fixture with individual walls, prior to assembly, can be shipped in a small compact package which will also require minimal space for storage; but in situations where shipment cost and storage space are of lesser importance than time saving convenience, then the embodiment that is a preformed one piece molded unit would be the preferred choice.

Further objects and advantages to the casket lid recessed light unit will become apparent from a consideration of the ensuing drawings, description and claims. In the following, like reference characters designate corresponding parts in the several views of the preferred embodiments. It will however be understood that this invention is not limited to the specific details and arrangements shown but may employ various changes, modifications, sizes, shapes and arrangements within the scope of the invention.

DRAWINGS FIGURES

FIG. 1 a perspective view of the recessed light unit.

FIG. 4 is a detail drawing of the bracket and corner fittings.

FIG. 5 is a detail drawing of a clip.

FIG. 6 is a detail drawing of the molded corner fitting and a bracket with adhesive surfaces.

Figure 1:
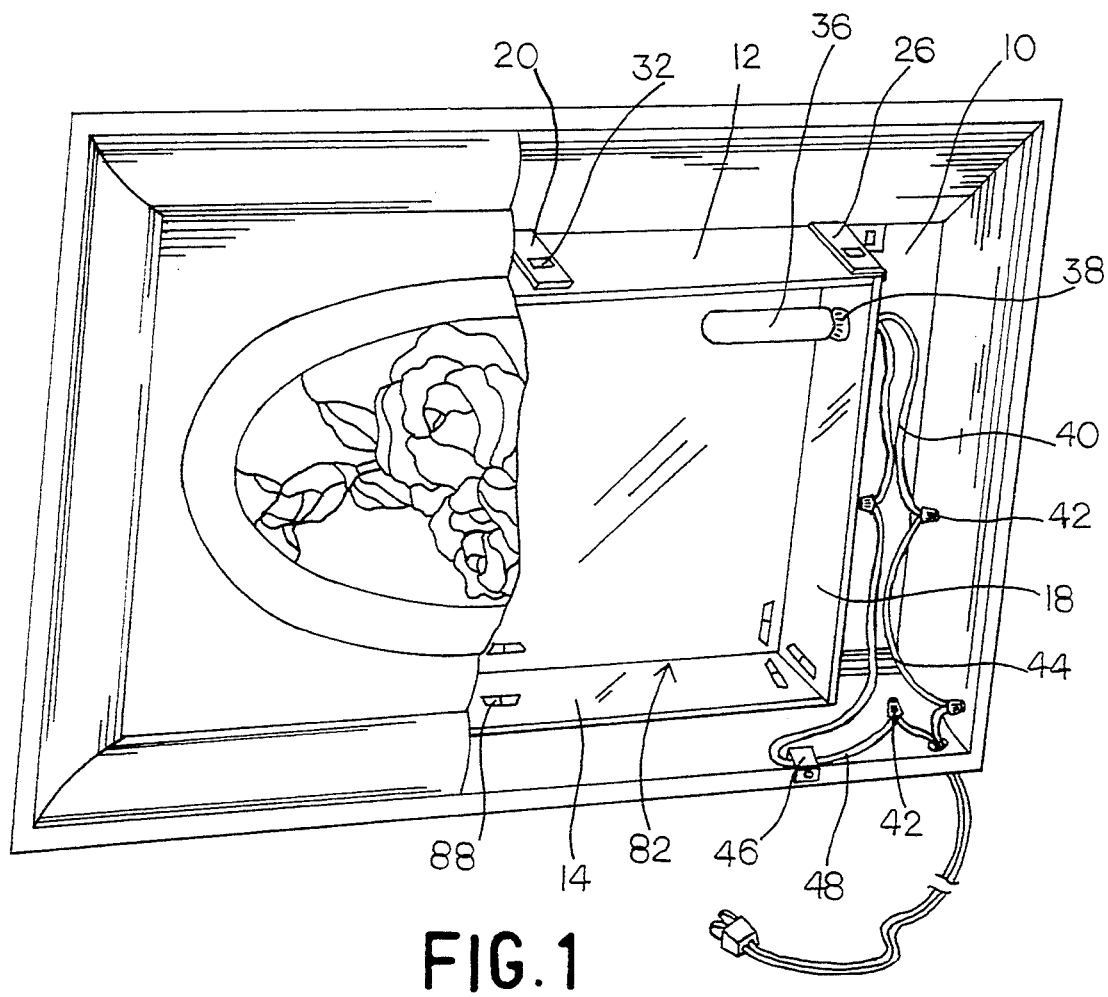
Figure 2:
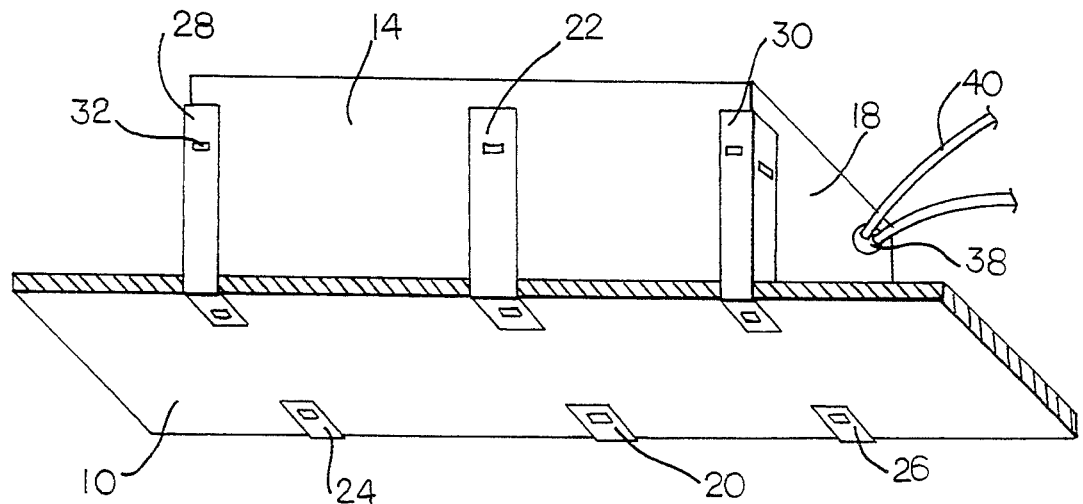
FIG. 2 is an oblique view of the recessed light unit from below.

FIG. 7 a perspective view of a portion of the recessed light unit showing a "single half-blind dovetail" joint as the method of joining the wall members.

FIG. 8 is a perspective view of the recessed light unit constructed as a seamless unit of formed material with reflective surfaces as an integral part of two wall members and with a fluorescent lamp as the light source.

FIG. 9 is a transverse sectional view of a recessed light unit with a fluorescent lamp, a reflector and reflective wall surface.

REFERENCE NUMBERS IN DRAWINGS 10 base
12 top wall
14 bottom wall
16 left wall
18 right wall
20 top wall to base bracket
22 bottom wall to base bracket
24 top and left walls to base corner fitting
26 top and right walls to base corner fitting
28 bottom and left walls to base corner fitting
30 bottom and right walls to base corner fitting
32 clips
34 holes
36 light source
38 socket for light source
40 electrical wires, from socket to wire nut
42 electrical wire nut
44 electrical wires, from wire nut to switch
46 electrical switch
48 electrical wires, from switch to wire nut
54 left vertical body of fittings 26 and 28
56 projection from left of fittings 26 and 28
58 right vertical body of fittings 26 and 28
60 projecting from right of fittings 26 and 28
62 left vertical body of fittings 24 and 30
64 projection from left of fittings 24 and 30
66 right vertical body of fittings 24 and 30
68 projection from right of fittings 24 and 30
70 vertical body of brackets 20 and 22
72 projection from brackets 20 and 22
74 adhesive surface
76 single half-blind dovetail joint
78 seamless formed wall unit
82 reflective surface integral with walls
84 reflector
86 crossbar of clip
88 ends of clip

DESCRIPTION-FIGS 1 to 9

Referring more particularly to FIGS. 1 to 5, the recessed light unit generally takes the shape of an open rectangular box. When installed in the open lid of a casket it would seem to be such a box positioned on its long side with its open area towards the front, while its base is next to the under-surface of the lid of the casket. The base of the box is elongated and extends beyond the lateral walls of the unit. The unit is comprised of four walls and a base made of rigid insulation, the type used in the building trade. The insulating material is about 1.27 cm to 1.91 cm in thickness. Each of the four walls and the base are joined at right angles by abutting the edge of one of the walls against the inside surface of the other so that the edge of one is exposed at an exterior corner. When the walls are assembled they are abutted to the inside surface of the base so that all edge surfaces of the base are exposed from the exterior views of the unit. The walls and base are held together by four novel corner fittings and two brackets which are secured to them with clips. A more detailed description follows.

A base 10 is connected to four walls; a top wall 12, a bottom wall 14, a left wall 16 and a right wall 18. Base 10 is substantially wider than top wall 12 and bottom wall 14 so as to fit snugly into the recessed area of the casket lid and to provide area for mounting and support for the unit. The walls and base are held together by corner fittings and brackets. With the corner fittings an additional two brackets hold long walls 12 and 14 to base 10, they are a top wall to base bracket 20, a bottom wall to base bracket 22. Each of the four corner fittings join, two side walls to base 10; they are a top and left walls to base corner fitting 24, a top and right walls to base corner fitting 26, a bottom and left walls to base corner fitting 28 and a bottom and right walls to base corner fitting 30.

Figure 3:
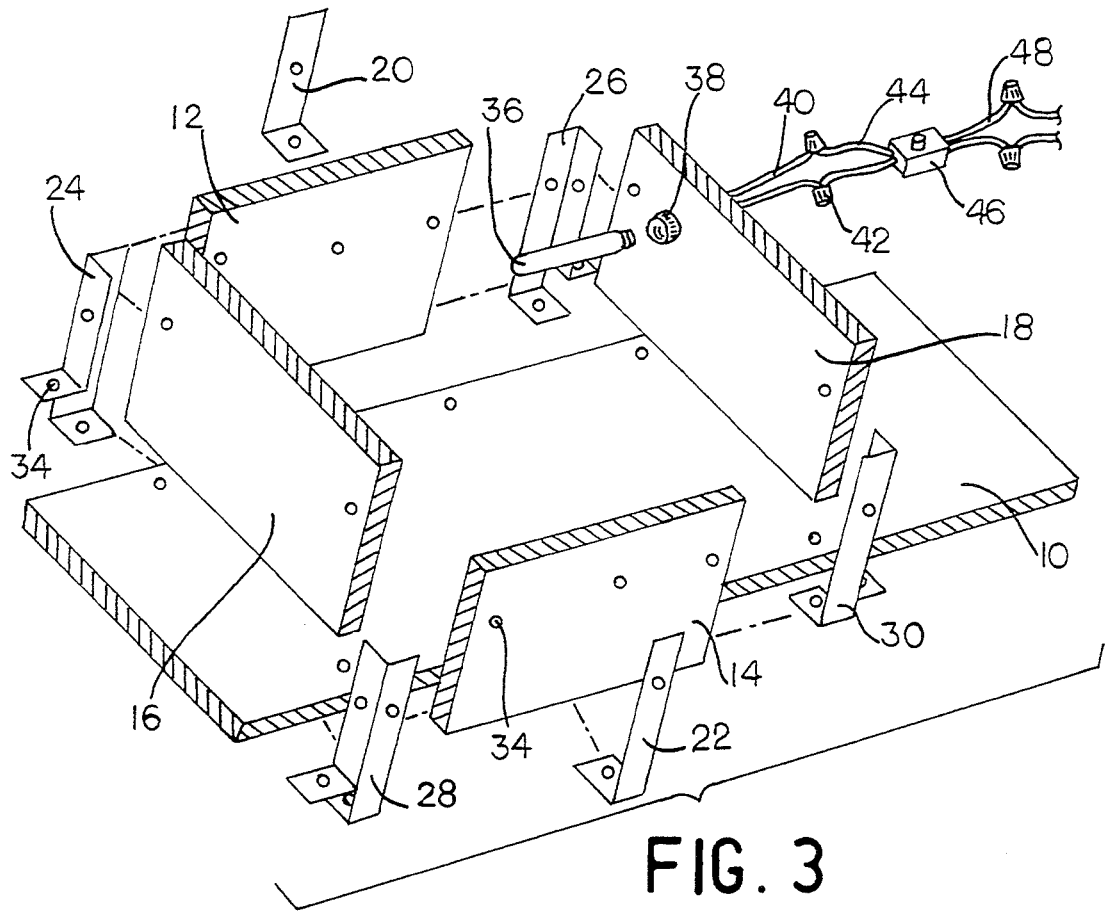
FIG. 3 is an exploded perspective view of the recessed light unit.

The source of illumination for the casket lid recessed light unit can include any standard low watt lamps and can be mounted any where on the walls or base. The illustrated embodiment shown in FIGS. 1 and 3 show the placement of a socket for a light source 38 and a light source 36 mounted onto right wall 18 but the number and placement of the light sources will vary to best enhance the art work it illuminates. The lamp within the unit emits light through the art work set in front of it. As noted among the objects and advantages the type of light source will also vary to meet the needs of the art it displays. A pair of electrical wires 40 lead from socket 38 to a pair of electrical wire nuts 42. If more than one lamp is used they can be coupled in parallel or joined at this point to form a single point of connection with a single source of energy needed to ignite all of the lamps. If the source of illumination is a fluorescent lamp, as shown in FIGS. 8 and 9, or another type of gas vapor lamp its ballast can be screwed into socket 38 or mounted in a manner well known in the arts (not shown) and connected using wire nuts 42. A pair of electrical wires 44 extend from for the first wire nuts 42 to an electrical switch 46. A pair of electrical wires 48 lead from switch 46 to the second set of wire nuts 42 that tie into a power source. The power may be supplied by a conventional electrical outlet, storage battery or solar collector (not shown).

FIG. 4 is a detail drawing of the two types of corner fittings and the bracket used in this embodiment. Two of each are used for a total of six connectors. These novel corner fittings join and reinforce the corners insuring sufficient strength and rigidity and facilitate assembly. The four corner fittings have projections onto which the edges of the walls and base are secured. Fitting 24 and fittings 30 are of the same design while fitting 26 and fitting 28 are of the same design. The two brackets that attach to the two longer walls 12 and 14 are of the same design, they are bracket 20 and bracket 22.

In this embodiment the corner fittings and brackets are formed of light sheet metal or of an extruded metal. The fittings and brackets may also be formed form a molded plastic as shown in FIG. 6. Fittings 26 and 28 have a finished height of 6.99 cm. Each has two sides at an angle of 90 degrees to each other, they are the right and left sides of the fitting. On the left side, a left vertical body 54 is 6.99 cm. The lower edge bends extending the metal out at an angle of 90 degrees away from the inside of the angle made by the right and left sides of the fitting. This is a projection from the left 56 with a length of 3.81 cm. Holes 34, which are 0.64 cm in diameter, are centrally located on vertical body 54 and projection 56 that extends from it. A right vertical body 58 of the fitting extends down to a length of 8.26 cm ending with a bend at an angle of 90 degrees forming a projection from the right 60. It extends towards the inside of the angle made by the right and left sides of the fitting. Projection 60 extends to a length of 2.54 cm. Hole 34 in vertical body 58 is centered lengthwise but is 0.64 cm from the outer vertical edge to adjust for the thickness of the insulating material. Hole 34 in projection 60 is also centered lengthwise and positioned 0.64 cm from the outer edge.

Fittings 24 and 30 also have a finished height of 6.99 cm. Each has two sides at an angle of 90 degrees to each other, they are the right and left sides of the fitting. A right vertical body 66 is 6.99 cm; the lower edge bends extending the metal out at an angle of 90 degrees away from the inside of the angle made by the right and left sides of the fitting. This is a projection from the right 68 with a length of 3.81 cm. Holes 34 are centrally located on vertical body 66 ad projection 68 that extends from it. A left vertical body 62 of the fitting extends down to a length of 8.26 cm ending with a bend at an angle of 90 degrees forming a projection from the left 64. Projection 64 extends towards the inside of the angle made by the right and left sides of the fitting. Projection 64 is 2.54 cm in length. The holes in vertical body 62 and projection 64 are centered lengthwise by are 0.64 cm from the outer vertical edge to adjust for the thickness of the insulating material.

The finished height of brackets 20 and 22 is 8.89 cm. Each is L-shaped with a vertical body 70. The lower edge ends in an angle of 90 degrees with a projection 72 which is 2.54 cm in length. Hole 34 in the vertical body is 2.54 cm from the top of the bracket and is horizontally centered. The hole in the projection is horizontally centered and 0.64 cm from the end.

In this illustrated embodiment each of the four corner-base fittings, 26, 28, 24 and 30 have four holes. Each of the two side brackets, 20 and 22 has two holes. It is through each of these holes that a clip 32 is inserted to secure the corner fittings and brackets in place. FIG. 5 is a detail drawing of clip 32. In this embodiment the clips are formed of light sheet metal material. Each clip is 3.18 cm in length, and has the overall form of the letter "T". A pair of ends 88 are tapered to insure ease in piercing the insulating material of which the unit is constructed. A crossbar 86 of each clip is 1.27 cm is width. When the clip is in position tapered ends 88 are separated and bent away from each other until the ends are flush with the insulating material thereby holding the corner fittings and brackets firmly in place.

FIG. 6 shows an adhesive surface 74 used with the connectors employed in this embodiment. The shapes of corner-base fittings 26, 28, 24 and 30 and brackets 20 and 22 are identical to that described above. This version does not require holes or clips. All of the inner surfaces of the fittings and brackets that come into contact with the exterior surfaces of the walls have an adhesive surface 64. The adhesive causes the walls to adhere to the fittings and brackets and thereby holds the unit securely together.

FIG. 7 shows another way of joining side walls to each other. A "single half-blind dovetail" joint 76 which is self retaining, is used to join the walls. These joints needs no other device to maintain the connection. As in the previous description brackets 20 and 22 are still used to secure the side walls to the base.

FIGS. 8 and 9 show embodiments of the unit having walls with a reflective surface 82 that is integral with the walls. The embodiment shown in FIG. 9 also has a reflector 84 which is a separate member of the unit. Reflective surface 82 and reflector 84 have finishes that are a bright metal or a material that is lustrous or mirrorized. It can be any sort of mirrorized surface that will efficiently reflect light rays. Reflector 84 is shaped in a general parabolic curved outline to focus the reflected light from the lamp through the display opening and the art to be illuminated.

The embodiment shown in FIG. 8 is different from the previous ones discussed in that the unit is a seamless formed unit 78. The walls of insulating material are made into a single unit formed of an insulating material therefore it needs no corner connectors, brackets, clips or adhesives. It is like the basic embodiment described above in all other ways.

The casket lid recessed light unit is a versatile light fixture in which all components needed for the unit are extremely simple, strong and light weight. It can be mass produced at low cost. All walls and base can be pre-cut to size in quantity using well established cutting procedures. The corner fittings and brackets can be formed from severed lengths of continuous strap-like stock material. All manufacturing steps are facilitated by preestablished common dimensions and the avoidance of time consuming, costly tooling adjustments for component production.

OPERATION-FIGS. 1 to 9

The recessed light unit is assembled prior to being installed into the lid of the casket. As can be seen in FIGS. 1 and 3 the four walls 12, 14, 16 and 18 are of equal heights. Opposing members 12 and 14 are of equal lengths as are members 16 and 18. The two sets of walls need not be of equal to each other as is shown in the illustrated embodiment. Base 10 supports the four walls of the light unit and is longer laterally than walls 12 and 14. The walls are set on the base, each on its long edge and at right angles to the base and its adjacent members. Adjacent wall members meet to form butt joints. If reflector 84 is used it is attached to the wall members. The four corner fittings are secured to the walls and base by clips 32 which are inserted into holes 34 and pushed to penetrate the insulating material of which the walls are formed. This process is facilitated by the pointed tips of the ends 88. The two layers of ends 88 are opened and bent back to lay flat against the insulating material as shown in FIG. 1. To further stabilized the longer walls 12 and 14, brackets 20 and 22 are attached at the midpoint of the walls using clips 32 as described above.

If the connectors and brackets have adhesive surfaces 74 as in the design shown in FIG. 6, clips are not necessary, the adhesive will hold the connectors and brackets to the walls and base. When the side walls are formed with dovetail joints 76 as shown in FIG. 7 the adjacent edges of the adjoining walls are equipped with matching dovetails and groves. The adjoining walls are held one above the other matching the points of contact. While fitting them together, they are slit into place until the upper edges of both walls are in a common plane. This is done for all four joints. Brackets 20 and 22 are used to attach the connected side walls to the base. From this point the operations of all of the embodiments are alike. Using either method the four walls of the light unit are held at right angle to each other and perpendicular to base 10.

Referring to FIG. 8, when seamless formed unit 78 is used the above information regarding the joining of walls can be omitted since the unit is formed in a single piece. All other information is pertinent.

The source(s) of illumination can be attached before or after the light unit is assembled. This is accomplished by the penetration and removal of a small portion of the insulating material with a common utility knife to accommodate the electrical socket. In the embodiment illustrated in FIG. 1 and 3 socket 38 is mounted onto the unit's right wall 18 and light source 36 is screwed into it.

The exact length and final shape of the base wall 10 will be cut into the material at the time the unit is fitted into the lid of the casket, this will insure a snug fit. When installed, base 10 is positionally located in a generally vertical plane and parallel to the interior of the top of the casket's lid. Electrical wire nuts 42 will be removed to facilitate the installation of the unit into the lid of the casket and then replaced once the installation is complete. While the casket lid recessed light unit is illustrated as it appears prior to installation it will be appreciated that the unit will be attached and supported within the casket lid in a way well know to those skilled in the art of casket finishing and which does not form part of this invention. In the preferred embodiment electrical switch 46 is secured to the lid of the casket in such a manner that when the lid of the casket is closed the switch will engage and stop the passage of electrical current.

The recessed light unit can be installed facing the casket's interior; set into the head lid, foot lid or both. It can also be used in the other parts of the casket such as the casket body or the exterior surfaces of the casket's lids. These applications would entail changes in the structure or the casket's design.

After the recessed light unit is installed the artistic element that is to be illuminated will be positioned and secured in place in front of the unit. When the artistic element is in the form of a panel, such as stained glass, it will be installed in a generally vertical plane in front of the unit, perpendicular to the walls and parallel to base 10 of the unit. There are no restrictions on the artistic elements that can be illuminated by the unit only that it must be of sufficient size and area so as to be seed from a reasonable distance.

SUMMARY OF INVENTION

The casket lid recessed light unit relates to burial caskets and one object is to provide a recessed source of illumination to light decorative art work that is installed in the lid of a casket. It will also provide softly diffused light for a more pleasing illumination of the interior of the casket.

Stained glass and other art forms that are dependent upon transmitted light have long been associated with funerals, memorial services and mausoleums. The recessed light unit makes it possible for these art forms to be incorporated into the casket itself. The recessed light unit is formed of lightweight rigid insulating material with base and walls securely held together by corner fittings and brackets formed of light weight sheet metal material. In another embodiment the unit is formed in one piece therefore needing no connectors. Because the unit is constructed of lightweight materials it does not add significantly to the weight of the casket but it is strong enough to support the decorative art.

A further feature of the casket lid recessed light unit resides in the versatility of the lightweight insulating material. With the use of a simple utility knife the walls or base of the unit can be penetrated at any point for the installation of light sources. This permits unlimited flexibility in the placement of lights to enhance the design of the art work. Also because of the versatility of the material, the back wall which serves as the base panel is easy to cut to fit the specific size and contour of any casket.

CONCLUSION RAMIFICATIONS AND SCOPE OF INVENTION

Thus the reader will se that the casket lid recessed light unit is highly original, strong, light weight, economical, useful and by which the principal objectives, among others are completely fulfilled.

The adaptability of the casket lid recessed light unit is provided not only by the flexible dimensional relationships heretofore described, but also by the selection of the material of which the unit is constructed. In this connection, it is significant that the unit is constructed of an insulating material either rigid, flexible or molded. The walls are penetrable using an ordinary cutting implements such as a utility knife, so that the dimensions of the base can be changed as necessary during installation.

It is apparent from the preceding description that the casket lid recessed light unit can be modified and embodied in other specific forms without departing from the spirit or essential characteristics thereof. It is to be understood that I do not desire to be limited to the exact details of construction shown and described, for obvious modifications will occur to a person skilled in the arts. While my above description contains many specificities, these should not be construed as limitations on the scope of the recessed light unit. The present embodiments are therefore to be considered in all respects as exemplifications of only a few possible embodiments and illustrative and not restrictive. Many variations not of critical importance to the invention's concept as has herein been described are possible. For example:

(1) the illuminated are of the unit can be square, round, oval, an elongated rectangle, or of any other configuration, depending upon the size and shape of the art it is to illuminate;

(2) the addition of other light reflectors, the surface of which are usually highly polished but may include white, matti, textured and other finishes; they can be mounted contiguously with the base and/or walls in any combination or could have other curvilinear in shapes and could be positioned at other points within the unit;

(3) the electrical switch might be omitted or attached at a variety of locations on the electrical cord or on the casket;

(4) the addition of a diffuser to minimize the glare from the lamps could be attached to the light source or located at any point between the lamp and the artwork;

(5) the use of alternative types or combinations of lamps for illumination;

(6) the corner fittings and brackets could be made of other materials of by other methods;

(7) the insulating material which forms the base and walls of the unit can be flexible or rigid in nature, self supporting or encased in an external support;

(8) and as discussed above, the source of illumination might be powered by battery or solar energy as that field of exploration advances.

While a few preferred embodiments of the casket lid recessed light unit are herein illustrated and described, it is to be appreciated that various changes and modifications may be made therein, such as those sited above, and others without departing from the meaning of the invention. Accordingly, the scope of the invention is indicated by the appended claims rather than by the foregoing illustrations and descriptions and all changes which come within the meaning, range, spirit or equivalency of the claims are therefore intended to be embraced therein.

I claim:

1. A light fixture of the type comprising a concave chamber made of an insulation material, said insulation material having an inner surface and an outer surface; said concave chamber having a back wall and a plurality of side wall members; said plurality of side wall members generally being a top wall, a bottom wall and a plurality of lateral wall members; said side wall members having a predetermined length and a predetermined depth such as to fit into a recessed area of a lid of a standard burial casket; said back wall having a plurality of side edges; said plurality of side wall members generally having a front edge surface, a back edge surface, a right edge surface and a left edge surface; said plurality of side wall members extend substantially perpendicular to said side edges of said back wall; said front edge surface of said top wall, said front edge surface of said bottom wall and said front edge surface of said plurality of lateral wall members have a common plane; said side wall members and said back wall form a corner joint; in combination with a means of joining said corner joint comprising a plurality of corner connector devices; said corner connector device comprising a formed material; said corner connector device having a lower edge and a top edge; a vertical bend forms a first side and a second side which are opposing sides, said lower edge of said first side extends out from said vertical bend, said lower edge of said second side extends in towards an inside of said vertical bend; a means of securing attaches said corner connector device to said insulation material; in combination with a means of illumination with a means of powering said means of illumination secured by a means of attachment to said inner surface of said insulation material.

2. The light fixture of claim 1 wherein said plurality of corner connector devices are formed of a sheet metal material.

3. The light fixture of claim 1 wherein said plurality of corner connector devices are formed of a molded material.

4. The light fixture of claim 1 wherein said plurality of corner connector devices are formed of an extruded metal.

5. The light fixture of claim 1 wherein said means of securing said insulation material to said plurality of corner connector devices is an adhesive coating.

6. The light fixture of claim 1 wherein said means of securing said insulation material to said plurality of corner connector devices is an adhesive coating.

7. The light fixture of claim 1 wherein said inner surface of said insulation material has a reflective finish.

8. The light fixture of claim 1 further including a means of light reflection where said means of light reflection is attached to said inner surface of said insulation material by a means of mounting of said means of reflection.

* * * * *